United States Patent
Roth et al.

(10) Patent No.: US 9,037,854 B2
(45) Date of Patent: May 19, 2015

(54) PRIVILEGED CRYPTOGRAPHIC SERVICES IN A VIRTUALIZED ENVIRONMENT

(71) Applicant: Amazon Technologies, Inc., Reno, NV (US)

(72) Inventors: Gregory Branchek Roth, Seattle, WA (US); Nachiketh Rao Potlapally, Arlington, VA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 13/746,924

(22) Filed: Jan. 22, 2013

(65) Prior Publication Data

US 2014/0208123 A1 Jul. 24, 2014

(51) Int. Cl.
*G06F 21/00* (2013.01)
*G06F 21/72* (2013.01)

(52) U.S. Cl.
CPC ........................... *G06F 21/72* (2013.01)

(58) Field of Classification Search
CPC ........................................................ H04L 9/08
USPC ................................................. 380/277–283
See application file for complete search history.

(56) References Cited

U.S. PATENT DOCUMENTS

| | | | | |
|---|---|---|---|---|
| 8,694,781 B1* | 4/2014 | Griffin et al. | ............. | 713/168 |
| 2004/0215848 A1* | 10/2004 | Craddock et al. | ............. | 710/39 |
| 2008/0134321 A1* | 6/2008 | Rajagopal et al. | ............. | 726/21 |
| 2008/0147555 A1* | 6/2008 | Cromer et al. | ............. | 705/52 |
| 2008/0244569 A1* | 10/2008 | Challener et al. | ............. | 718/1 |
| 2009/0037682 A1* | 2/2009 | Armstrong et al. | ............. | 711/164 |
| 2012/0027213 A1* | 2/2012 | Scarlata | ............. | 380/283 |
| 2013/0003976 A1* | 1/2013 | An et al. | ............. | 380/277 |
| 2014/0059541 A1* | 2/2014 | Heninger et al. | ............. | 718/1 |
| 2014/0173689 A1* | 6/2014 | Klustaitis et al. | ............. | 726/2 |

OTHER PUBLICATIONS

Sahni et al. "A Hybrid Approach to Live Migration of Virtual Machines;" Varma, V. Cloud Computing in Emerging Markets (CCEM), 2012 IEEE International Conference on 2012 , pp. 1-5.*

Vasudevan et al.; "Design, Implementation and Verification of an eXtensible and Modular Hypervisor Framework;" Security and Privacy (SP), 2013 IEEE Symposium on 2013 , pp. 430-444.*

* cited by examiner

*Primary Examiner* — Christopher Brown
*Assistant Examiner* — Roderick Tolentino
(74) *Attorney, Agent, or Firm* — Hogan Lovells US LLP (57) ABSTRACT

A privileged cryptographic service is described, such as a service running in system management mode (SMM). The privileged service is operable to store and manage cryptographic keys and/or other security resources in a multitenant remote program execution environment. The privileged service can receive requests to use the cryptographic keys and issue responses to these requests. In addition, the privileged service can measure the hypervisor at runtime (e.g., either periodically or in response to the requests) in an attempt to detect evidence of tampering with the hypervisor. Because the privileged service is operating in system management mode that is more privileged than the hypervisor, the privileged service can be robust against virtual machine escape and other hypervisor attacks.

26 Claims, 6 Drawing Sheets

PRIVILEGED CRYPTOGRAPHIC SERVICES IN A VIRTUALIZED ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization and multitenant architectures to allow multiple users to share the underlying hardware and/or software resources. Virtualization can allow computing servers, storage device or other resources to be partitioned into multiple isolated instances that are associated with (e.g. owned by) a particular user. This can enable various users to run their applications remotely, using on the resources of the cloud computing provider.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing security in computing systems, such as may be deployed in virtualized computing environments. In particular, various embodiments utilize a privileged cryptographic service, such as a service running in system management mode (SMM), to store and manage cryptographic keys and/or other security resources in a multitenant remote program execution environment (e.g., cloud computing environment).

In various embodiments, the multitenant remote program execution environment is provided by a service provider to one or more customers. The environment can include a plurality of host computing devices, where each host computing device includes a hypervisor that manages one or more virtual machines. Each virtual machine may be associated with (e.g., owned by) a particular customer of the service provider and the virtual machine can run customer-provided code (e.g., applications, services, etc.) on behalf of the customer using the physical resources of the service provider.

In conventional multitenant remote program execution environments, if a customer's code can escape the environment of the virtual machine and instead operate within the context of the hypervisor, the code may be able to obtain access to some highly sensitive information and other resources that are resident on the host computing device. This potential vulnerability is often referred to as a virtual machine escape. For example, if one customer's code is able to operate within the context of a hypervisor, the code can potentially obtain access to another customer's cryptographic keys and other security information, export those keys to other locations and perform numerous other malicious acts.

In various embodiments, to prevent or reduce exposure to such unauthorized actions, each host computing device includes a privileged service that is capable of running in a system management mode (SMM) or some other mode that is more privileged than the hypervisor and/or other operating systems on the host computing device, or having access to at least a portion of memory that is inaccessible to the hypervisor. For example, the privileged service may operate in system management mode, in which all normal execution by the hypervisor, virtual machines or other operating systems is suspended and in which the privileged service is executed. The privileged service can store and manage one or more cryptographic keys; receive requests to use the cryptographic keys from the hypervisor, one or more virtual machines and/or or other entities; as well as issue responses to these requests. In addition, the privileged service can measure the hypervisor at runtime (e.g., either periodically or in response to the requests) in an attempt to detect evidence of tampering with the hypervisor. Because the privileged service is operating in system management mode that is more privileged than the hypervisor, the privileged service can be robust against virtual machine escape and other hypervisor attacks. Under this scheme, a compromised hypervisor would not be able to export cryptographic keys managed by the privileged service. Furthermore, if the hypervisor is detected to have been tampered with, it may be prevented from using the keys or some other action may be performed, such as destroying all key materials stored by the privileged service.

In some embodiments, the privileged service can be used to manage a trusted platform module (TPM) or other cryptographic processor on the host computing device. In these embodiments, the TPM can manage root keys and enable only the privileged service running in SMM to access derived keys. The SMM can in turn provide the use of the keys to the hypervisor and virtual machines. In one embodiment, during initial boot of the host computing device, the privileged service can measure one or more values of the hypervisor to ensure that a trusted hypervisor was launched. Subsequently at runtime, a system management interrupt (SMI) routine can be used to re-measure the hypervisor and compare the runtime measurements against the initial values measured at boot time to detect evidence of tampering.

In some embodiments, the privileged service can be used to provide virtual TPM services to a virtual machine with the keys managed by the SMI handler and inaccessible to the hypervisor. The trusted keys can be rooted in a physical TPM to ensure that keys were only delivered to SMI handlers to guard against compromise of a hypervisor within a system that includes a plurality of hypervisors providing virtual TPM services to a multiple customers. In this manner, any virtual machine escape would not expose the cryptographic keys of one customer to another customer.

Figure 1:
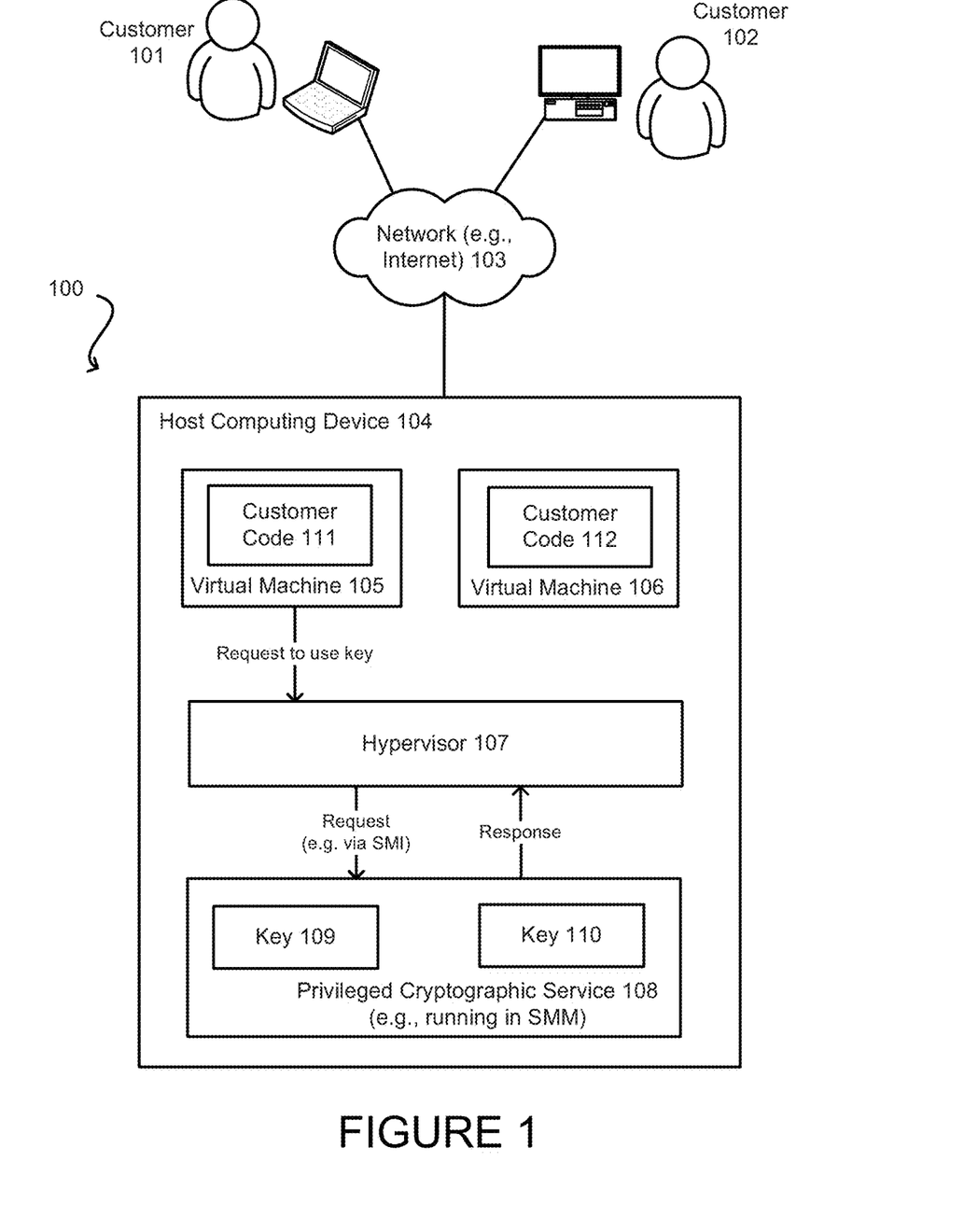
FIG. 1 illustrates an example of a privileged service that manages cryptographic key information, in accordance with various embodiments.

FIG. 1 illustrates an example 100 of a privileged service that manages cryptographic key information, in accordance with various embodiments. In the illustrated embodiment, the host computing device 104 includes a hypervisor 107 that manages one or more virtual machines (105, 106) where each virtual machine is associated with a customer (101, 102). The one or more virtual machines (105, 106) can execute code (111, 112) provided by the one or more customers (101, 102). The customers can provide the code to be executed on the virtual machines over a network 103, such as the Internet. In order to provide secure cryptographic services, the host computing device 104 further includes a privileged service 108.

In accordance with an embodiment, the privileged cryptographic service 108 is running on host computing device 101 in system management mode (SMM) or other mode that is more privileged than the hypervisor 107 or other operating system. In one embodiment, SMM is an operating mode in which all normal execution by the hypervisor, virtual machines or other operating systems is suspended and in which the privileged service is executed. The SMM can be triggered by a system management interrupt (SMI) which can be invoked by the hypervisor, virtual machine (VM) or other software code running on the host computing device. It should be noted that the various embodiments described throughout this disclosure are not limited to SMM or SMI implementations and any other modes of operation are possible as will be evident to one of ordinary skill in the art. For example, in another implementation, the privileged service may have access to a portion of memory that the hypervisor does not have permissions to access. This can be implemented by dedicating, exclusively to the privileged service, a specific portion of main memory partitioned using one or more range registers. Alternatively, the privileged service may be provided exclusive access to the memory internal to one or more co-processors, registers dedicated to one or more modes, or specific cryptographic key registers.

In accordance with an embodiment, the privileged service 108 authenticates itself and stores one or more cryptographic keys (109, 110) and/or other security resources. The one or more keys (109, 110) can be received from the hypervisor 107, the one or more virtual machines (105, 106) and/or external computing devices. In some embodiments, the cryptographic keys (109, 110) can be generated by one of the virtual machines (105, 106). Each key can be owned by a particular customer (101, 102) and/or associated with a particular virtual machine (105, 106). For example, key 109 may be associated with virtual machine 105, while key 110 is associated with virtual machine 111.

In accordance with an embodiment, the privileged service 108 running in SMM is also operable to communicate with the hypervisor 107 and/or the virtual machines (105, 106) and to receive requests to make use of the cryptographic keys (109, 110) that the privileged service stores. In one embodiment, the privileged service 108 is invoked using a system management interrupt handler routine. For example, the request can be initiated by a component running in the virtual machine 105 that causes the hypervisor 107 to invoke an SMI to request the privileged service 108 to use the cryptographic key 109. In various embodiments the request can be any request that requires the use of the cryptographic key, including but not limited to requests that one or more computations be performed using the key or requests to transmit one or more messages encrypted or signed using the key.

In some embodiments, the privileged service 108 can generate a response in response to the request, where the response is based at least in part on the cryptographic keys that the service stores. In some embodiments, as part of the request, the privileged service 108 may also receive proof (e.g., authorization information) authorizing the virtual machine to use a particular key. That proof may be received by the hypervisor or by the virtual machine running on the hypervisor from a customer. The proof may also be generated on a virtual machine running on a hypervisor.

In various embodiments, because the privileged service 108 is operating in a mode that is more privileged than the hypervisor, in the event of virtual machine escape and/or hypervisor tampering, the hypervisor can still be prevented from cross-account use of keys stored by the privileged service.

Figure 2:
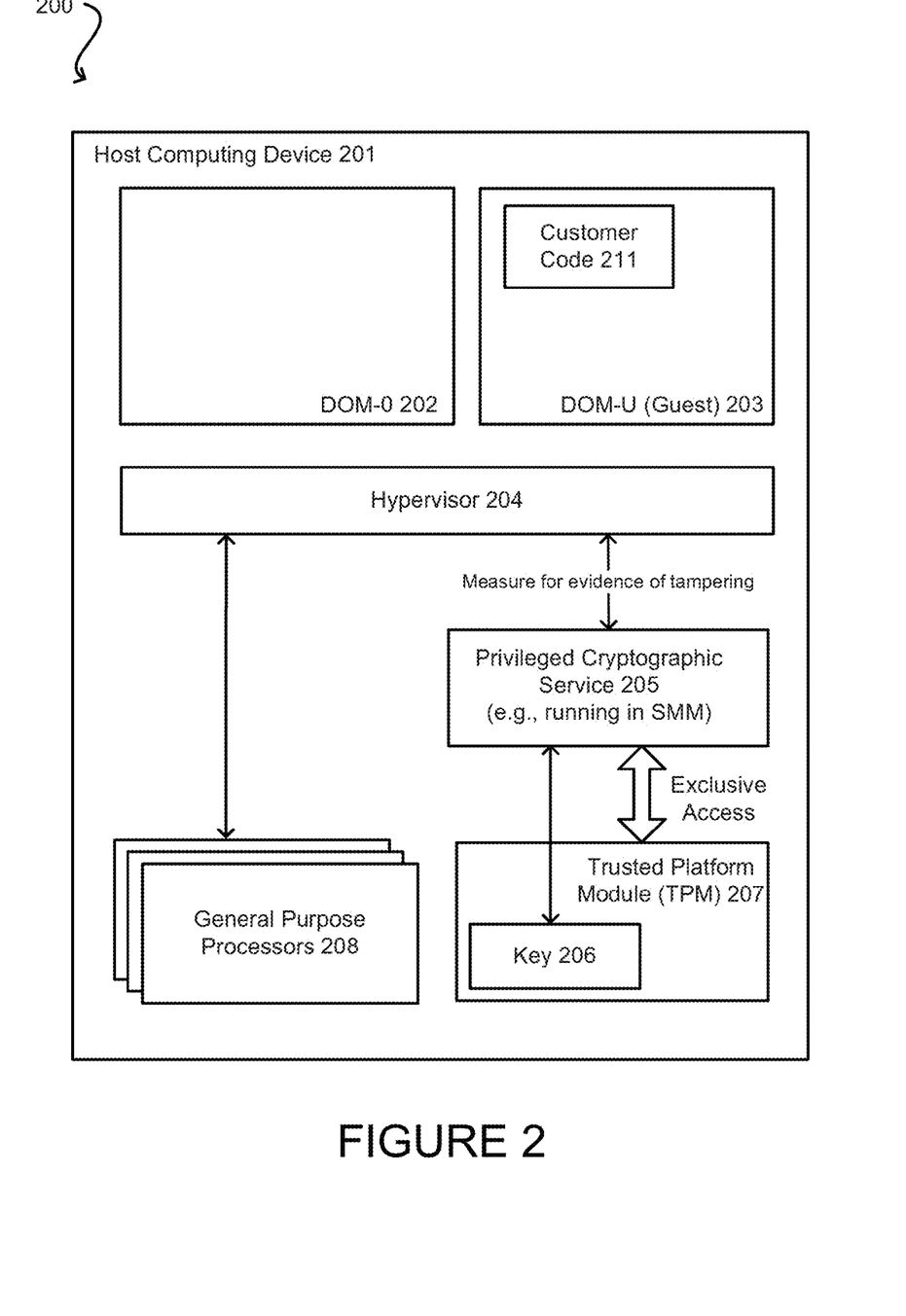
FIG. 2 illustrates an example of a privileged service implementation that utilizes a trusted platform module (TPM), in accordance with various embodiments.

FIG. 2 illustrates an example 200 of a privileged service implementation that utilizes a trusted platform module (TPM), in accordance with various embodiments. In the illustrated embodiment, the host computing device 201 includes one or more general purpose processors 208 and a trusted platform module 207. The host computing device further includes a hypervisor 204, a privileged domain (e.g., DOM-0 202) having direct access to the one or more processors, and one or more unprivileged domains (e.g., DOM-U 203) that have virtualized access to the one or more processors of the device and which run customer-provided code.

In various embodiments, a trusted platform module (TPM) 207 can be any secure cryptographic processor that is capable of storing cryptographic keys 206 that protect information. The privileged service 205 can allow boot time measurement of the hypervisor 204, as well as dynamic re-measurement of a running hypervisor 204. In one embodiment, during boot time, the privileged service 205 executing in system management mode can take ownership of the TPM 207 such that SMM memory could be exclusively authorized of interacting with the TPM 207. This can give the privileged cryptographic service 205 running in SMM the ability to persist keys 206 between boots and to authenticate itself to remote software. The TPM 207 can manage root keys and enable only the privileged service 205 running in SMM to access derived keys. In this embodiment, the privileged service can provide the use of the keys to the hypervisor and virtual machines.

In various embodiments, the privileged service 205 running in SMM can measure the running hypervisor either periodically or in response to receiving requests from the hypervisor to make use of the cryptographic keys that the privileged service 205 manages. For example, at boot time, the privileged service 205 (or other component) can be used to measure one or more values associated with the hypervisor 207 and to ensure that a valid hypervisor is loaded. For example, to measure the one or more values, the privileged service 205 can read one or more locations in memory that contain the code of the hypervisor 207 and hash the values contained in those locations. The hash values are then stored and can be used to later check whether the code of the hypervisor 207 was altered in any way. In another embodiment, rather than measuring the values itself, the privileged service can be provided the hash values by another entity, such as the Basic Input/Output System (BIOS). For example, when provisioning the privileged service 205 (e.g., to operate in SMM), the BIOS may provide the hash values for the hypervisor code to the privileged service.

Subsequently, at runtime, the one or more values can be re-measured to detect any tampering with the hypervisor 207. For example, if the values obtained at runtime do not match the initial values, the privileged service 205 may determine that the hypervisor 207 has been compromised and take appropriate corrective actions. For example, the privileged service may prevent the hypervisor from using any keys stored by the privileged service or may suspend the hypervisor altogether. Alternatively, the privileged service may destroy all key materials stored in response to detecting evidence of tampering. Yet as another example, the privileged service may notify an external service or entity, with an indication that the hypervisor may be compromised. In some embodiments, the privileged service 205 can be used to provide virtual TPM services to a virtual machine, where the keys associated with the virtual TPM are managed by the privileged service (e.g., SMI handler) and are inaccessible to the hypervisor. The virtual machines can thus use the SMI handler to submit requests to use the key, without the hypervisor having access to the key. In one embodiment, the trusted key can be rooted in a physical TPM 207 to ensure that keys were only delivered to SMI handlers. This may guard against compromise of a hypervisor within a system comprising a multitenant environment of hypervisors providing virtual TPM services to a plurality of customers such that a virtual machine escape would not expose customer keys.

It should be noted that although FIG. 2 illustrates an implementation that utilizes a hypervisor, a DOM-0 and at least one DOM-U, this particular implementation is not intended to be limiting to all of the embodiments described herein. In alternative embodiments, the term hypervisor can include numerous other implementations, such as virtual machine managers or other virtualization technologies. For example, in an alternative implementation, the hypervisor includes the functionality of the DOM-0 and does not utilize a separate privileged domain such as DOM-0. Moreover, a type 1 hypervisor or a type 2 hypervisor can be utilized within the scope of the various embodiments. As known in the art, a type 1 hypervisor (e.g., bare metal) runs directly on the host computer's hardware to control the hardware and to manage one or more guest operating systems. In type 1 configurations, a guest operating system runs on another level above the hypervisor. A type 2 (e.g., hosted) hypervisor runs within a conventional operating system environment. With the hypervisor layer as a distinct second software level, guest operating systems run at the third level above the hardware. In various embodiments, either type of hypervisor can be utilized within the scope of the present disclosure.

Similarly, although FIG. 2 illustrates a trusted platform module implementation, this is also not intended to be limiting to all of the embodiments described herein. In alternative embodiments the privileged cryptographic service can be used in conjunction with other types of cryptographic processors. Furthermore, in some embodiments, the privileged cryptographic service can be used with any co-processor on the machine that is not operable to run code of the virtual machines, including but not limited to a remote management card, a baseboard management controller (BMC), a manageability engine and the like. In these embodiments, the firmware of such co-processors can be replaced with firmware implementing the privileged cryptographic service. The processor can be enabled to make specific requests to receive the cryptographic keys and other information.

Figure 3:
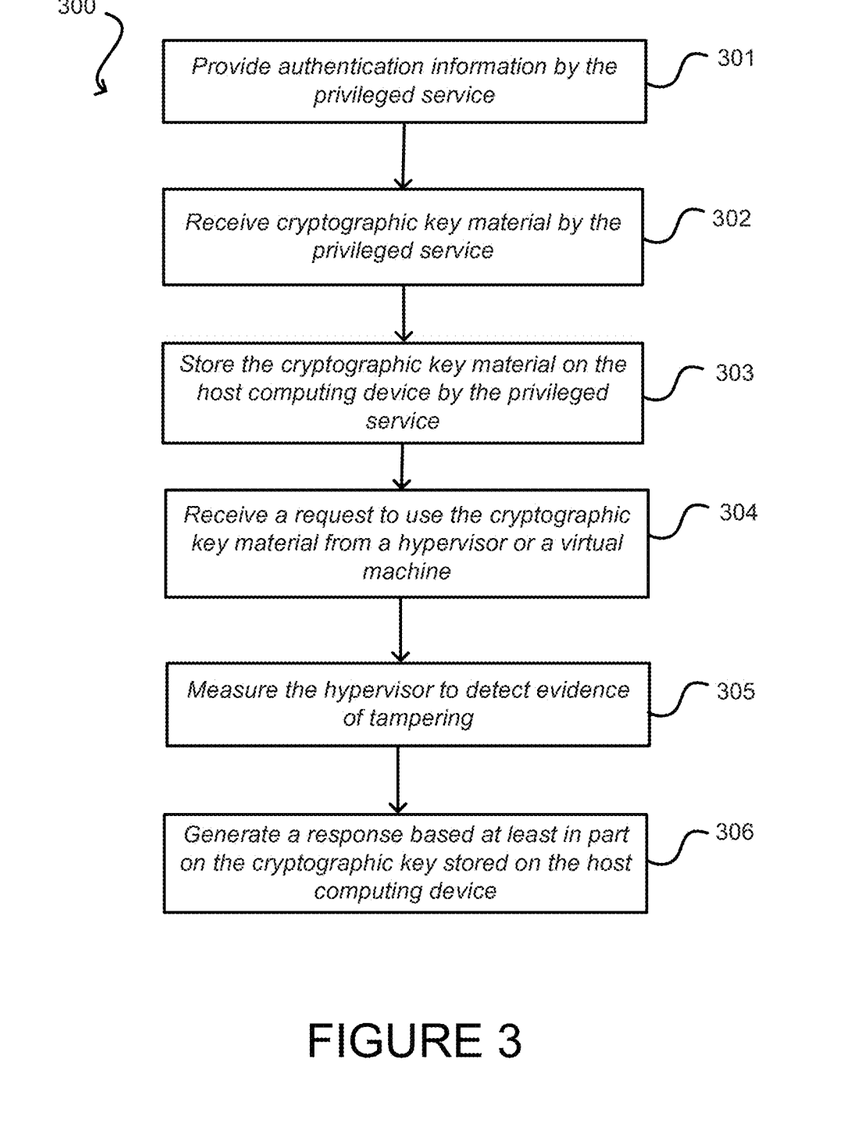
FIG. 3 illustrates an example process for providing privileged cryptographic service on a host computing device, in accordance with various embodiment.

FIG. 3 illustrates an example process 300 for providing privileged cryptographic service on a host computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 301, the privileged service authenticates itself to obtain the key and/or other cryptographic material. In one embodiment, the privileged service can authenticate itself with an external computing device or service that provides the cryptographic keys to the privileged service. In another embodiment, the privileged service does not authenticate against any external entities. In some embodiments, the keys can be generated by the service provider, while in other embodiments, the keys can be provided by the customer to be used with their virtual machines, or generated by the virtual machine. In operation 302, the privileged service receives one or more cryptographic keys if successful authentication is performed.

In operation 303, the privileged service stores the one or more cryptographic keys on a host computing device. As previously described, the host computing device can include a hypervisor that manages one or more virtual machines and the privileged service operates in a higher privileged mode than the hypervisor.

In operation 304, the privileged service receives a request to use the cryptographic key stored on the device. In accordance with an embodiment, an interrupt signal (e.g., SMI) can be received that requests to use the key. The request can be received from a component running on the hypervisor or on the one or more virtual machines. In various embodiments the request can be any operation that uses the cryptographic key, including but not limited to requests that one or more computations be performed using the key or requests to transmit one or more messages encrypted or signed using the key.

In operation 305, the privileged service measures the hypervisor in response to the request. For example, the privileged service may compare values obtained at boot time with values measured at runtime to detect any evidence of tampering with the hypervisor.

In operation 306, the privileged service generates a response to the request based at least in part on the cryptographic key stored on the host computing device. In some embodiments, if the privileged service determines that the hypervisor has been tampered with, the hypervisor may be prevented from accessing the key.

Figure 4:
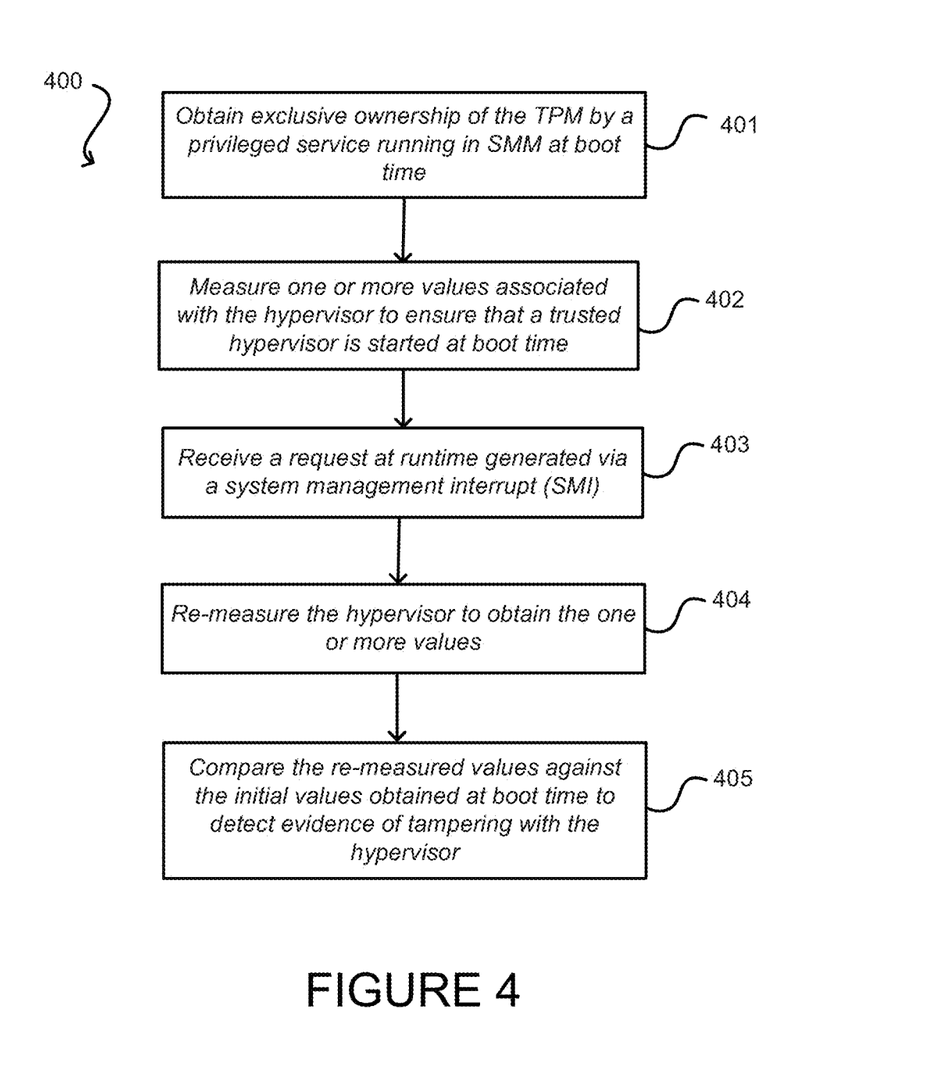
FIG. 4 illustrates an example of a process that can be performed by the privileged service that uses the TPM to measure the hypervisor and to detect evidence of tampering, in accordance with various embodiments.

FIG. 4 illustrates an example 400 of a process that can be performed by the privileged service that uses the TPM to measure the hypervisor and to detect evidence of tampering, in accordance with various embodiments. In operation 401, at boot time of the host computing device, the privileged service obtains exclusive ownership of the TPM. Additionally, at boot time, the TPM obtains one or more values associated with the hypervisor to ensure that a trusted hypervisor is loaded on the host computing device (operation 402). In one embodiment, to measure the one or more values, the privileged service reads one or more locations in memory that contain the code of the hypervisor and hashes the values contained in those locations. The hash values are then stored and can be used to later check whether the code of the hypervisor was altered in any way. In another embodiment, rather than measuring the values itself, the privileged service can be provided the hash values by another entity, such as the BIOS. For example, when provisioning the privileged service (e.g., to operate in SMM), the BIOS may provide the hash values for the hypervisor code to the privileged service.

In operation 403, subsequently at runtime, the privileged cryptographic service receives a request to use the cryptographic key. In one embodiment, the request is generated by invoking a system management interrupt (SMI). In operation 404, the one or more values associated with the hypervisor are re-measured at runtime. In operation 405, the privileged service compares the re-measured values against the initial values obtained at boot time to detect evidence of tampering with the hypervisor.

In accordance with various embodiments, hypervisor measurement can be used to determine whether the cryptographic key can be released for use (e.g., for use by a virtual machine). In order to manage the cryptographic key, a number of cryptographic operation implementations are possible. One such possible implementation of a key management process is described below.

In this particular implementation, the BIOS initializes the system management interrupt (SMI) handlers which are invoked every time an SMI interrupt is issued that puts the processor in SMM. TPM can provide an ability to make cryptographic hash measurement of the BIOS, including the SMI handlers, and store these hash values in TPM hardware registers known as platform configuration registers (PCRs). Thus, by comparing known hash values of trusted SMI handlers against hash values recorded in the PCRs, it provides an ability to verify that trusted SMI handlers are installed on the platform. The SMI handlers can be stored in a region of memory called system management random access memory (SMRAM), which is locked by the BIOS, and is not accessible by any software running in non-SMM mode (including the hypervisor and OS). In this embodiment, the trusted hypervisor is cryptographically measured, and this can happen in two ways:

(1) The trusted bootloader can measure the hypervisor before transferring execution control to the hypervisor, and store the hash value in a PCR; or (2) The trusted bootloader can issue a SMI interrupt. A SMI handler can measure the hypervisor and store the cryptographic hash value in the SMRAM.

In this embodiment, the hash value of a trusted hypervisor can be referred to as the reference hash value. Subsequently, there can be two steps in the platform run-time key management flow, namely key provisioning and key usage. In one embodiment, the details of these flows are as follows:

Key Provisioning: when a trusted hypervisor is initially booted up, the hypervisor checks the PCRs to ensure that trusted SMI handlers are installed on the platform. If he trusted SMI handlers are verified, then the hypervisor generates cryptographic keys and other credentials (password etc.), places them in memory or registers and issues a SMI interrupt. The SMI handler, which is responsible for provisioning the keys, copies the cryptographic keys into a key storage data structure in SMRAM, and erases the keys in memory/registers. The SMI handler returns an index value, corresponding to the stored key, to the hypervisor.

Key usage: when a hypervisor needs access to a specific cryptographic key, the hypervisor issues a SMI interrupt along with giving the corresponding index value. Next, the SMI handler performs cryptographic hash measurement of the hypervisor, and compares this hash value with the reference hash value computed during boot. Since the SMI handler execution happens independently of a hypervisor, it cannot tamper with its measurement operation. If the hash values match, then the SMI handler returns the requested credentials. A mismatch in hash values indicates run-time hypervisor corruption, and the SMI handler would return an error message.

In one embodiment, given that the SMRAM is not accessible to the hypervisor, a malicious hypervisor or a corrupted hypervisor will not be able to access the keys stored by a trusted hypervisor. Thus, the secrets in SMRAM are safe from any malicious attacks against the hypervisor.

In some embodiments, this key management process can be also used by guest virtual machines (VMs) to store cryptographic keys and credentials where the guest VMs issue SMIs to store secrets. The operational flow of a secrets management scheme for a guest VM would be as follows:

a. Guest VM issues a SMI to check whether the hypervisor is trusted or not. The SMI handler cryptographically measures the hypervisor, and compares this value with the reference hash value. The SMI handler returns a value indicating whether the hypervisor is trusted or not;

b. If a SMI handler returns a value indicating the hypervisor is trusted, then the guest VM issues another SMI interrupt to store a new cryptographic key or retrieve a previously stored cryptographic keys (or credentials).

In this flow, the guest VM has to issue two SMIs, namely the first one to verify the hypervisor, and the second to store or retrieve the secrets from SMRAM. If the hypervisor is malicious or get corrupted during run-time by a malware, then the credentials of the guest VM are not exposed to it (even if the hypervisor issues a SMI since the hypervisor integrity checks will fail).

Figure 5:
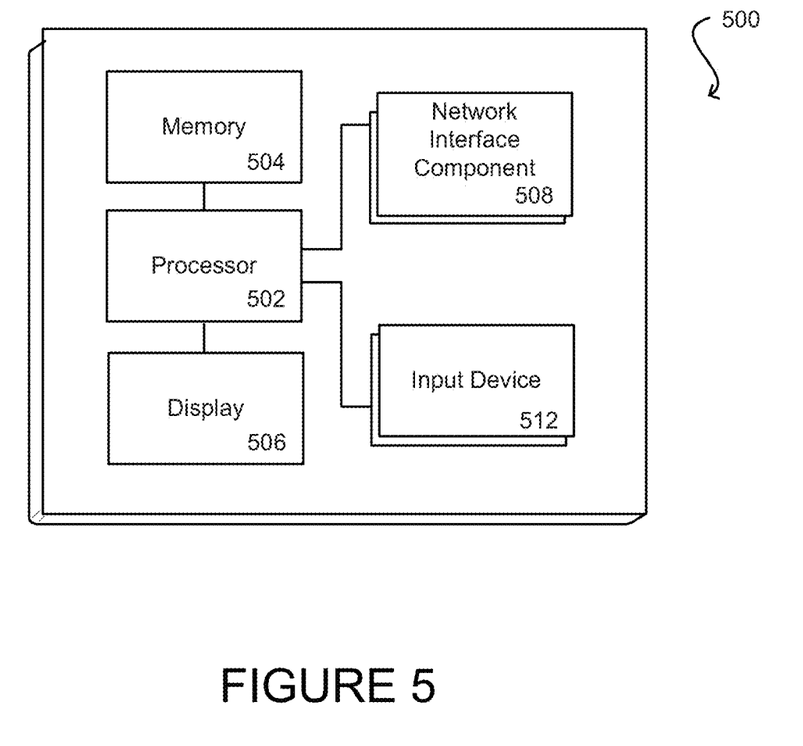
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
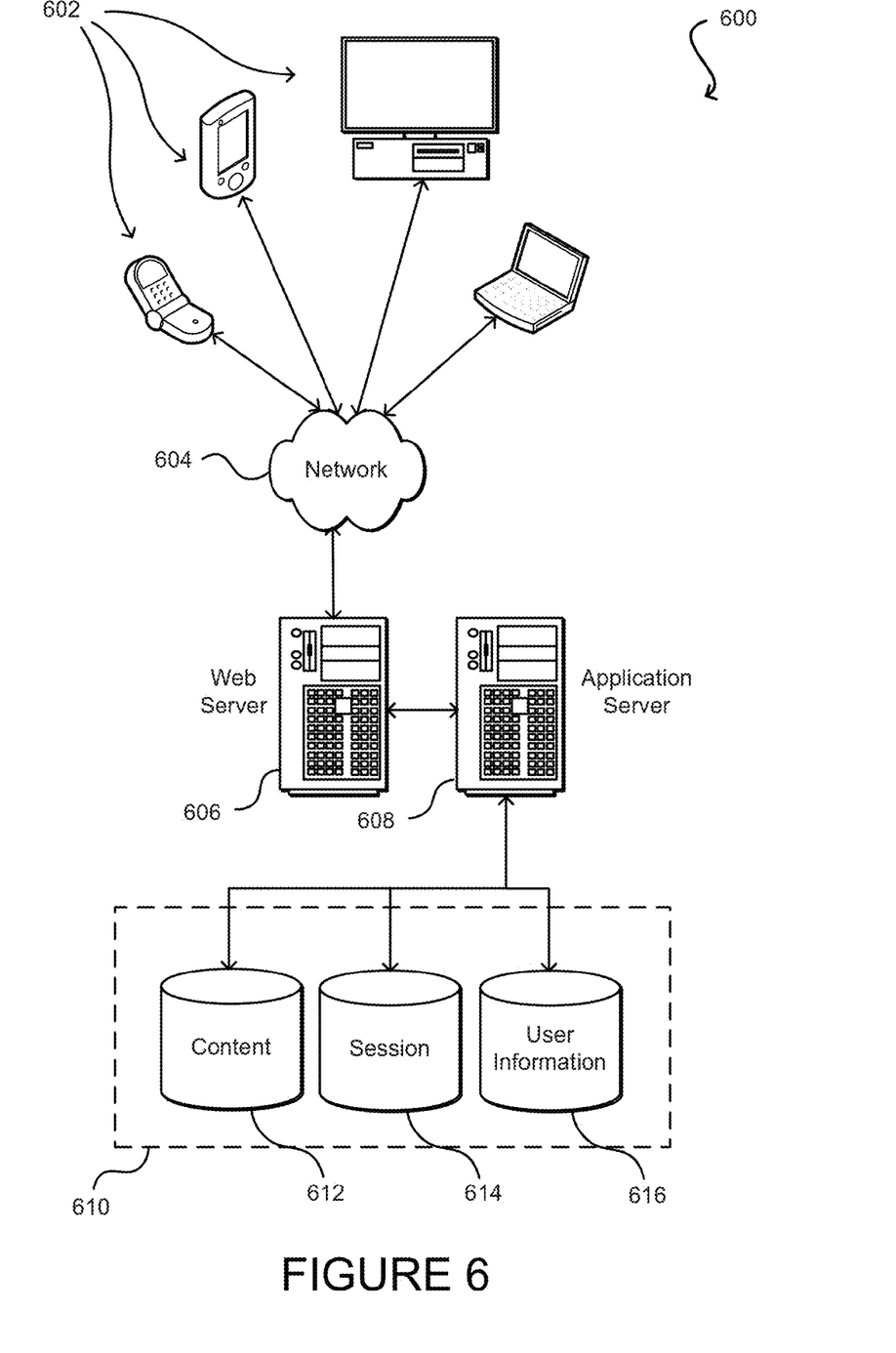
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   memory including instructions that are executed by the at least one processor of the device to implement:
   a hypervisor that manages one or more virtual machines, each virtual machine associated with a respective customer and configured to execute customer-provided code; and
   a privileged service that is capable of suspending the hypervisor and running in system management mode (SMM) on the host computing device, the privileged service configured to:
   receive a cryptographic key associated with a customer and store the cryptographic key on the host computing device;
   receive a request to use the cryptographic key from at least one of: the hypervisor or the one or more virtual machines, the request generated by initiating a system management interrupt (SMI);
   measure one or more values associated with the hypervisor;
   determine that the hypervisor is unaltered based at least in part on the one or more values; and
   generate a response to the request after determining that the hypervisor is unaltered, the response based at least in part on the cryptographic key stored on the host computing device.

2. The computing device of claim 1, wherein the host computing device stores a second cryptographic key for a second customer, and wherein the customer-provided code of the customer that is executing in a context of the hypervisor is prevented from extracting the second cryptographic key stored on the host computing device for the second customer.

3. The computing device of claim 1, wherein measuring the one or more values associated with the hypervisor further comprises:
   measuring one or more values associated with the hypervisor obtained at boot time of the host computing device;
   measuring the one or more values associated with the hypervisor at runtime; and
   determining whether the hypervisor was altered based at least in part on comparing the one or more values measured at boot time with the one or more values measured at runtime.

4. The computing device of claim 1, further comprising:
   a trusted platform module (TPM) configured to store the cryptographic key, wherein the privileged service is further configured to obtain exclusive access to the TPM and manage access to the cryptographic key stored on the TPM.

5. A computing device, comprising:
   at least one processor; and
   memory including instructions that, when executed by the at least one processor, cause the computing device to implement:

a hypervisor that manages one or more virtual machines and having access to a first portion of memory; and a privileged service having access to at least a second portion of memory that is inaccessible to the hypervisor, the privileged service capable of suspending the hypervisor and running in system management mode (SMM) on the computing device, the privileged service configured to:

store a key on the computing device;

receive a request to use the key from at least one of: the hypervisor or the one or more virtual machines;

measure one or more values associated with the hypervisor;

determine that the hypervisor is unaltered based at least in part on the one or more values associated with the hypervisor; and generate a response to the request after determining that the hypervisor is unaltered, the response based at least in part on the key stored on the computing device.

6. The computing device of claim 5, wherein the privileged service is executed using at least one of:

a cryptographic processor, a remote management card, a baseboard management controller (BMC), a component executing in system management mode (SMM), or a manageability engine.

7. The computing device of claim 5, wherein the second portion of memory is at least one of: a portion of main memory partitioned using one or more range registers, memory internal to one or more co-processors, memory attached to one or more co-processors, registers dedicated to one or more modes, or specific cryptographic key registers.

8. The computing device of claim 5, wherein the privileged service is further configured to:

measure one or more second values associated with the hypervisor;

determine that the hypervisor has been altered based at least in part on the one or more second values associated with the hypervisor; and notify an external entity in response to determining that the hypervisor has been altered; or delete the cryptographic key in response to determining that the hypervisor has been altered.

9. The computing device of claim 5, further comprising:

a component configured to submit the request to the privileged service by using a system management interrupt (SMI), the component residing in at least one of: the hypervisor or the virtual machine.

10. The computing device of claim 5, further comprising:

a trusted platform module (TPM) configured to store the key, wherein the privileged service is further configured to obtain exclusive access to the TPM.

11. The computing device of claim 10, wherein the privileged service is further configured to control access to the key stored in the TPM by the hypervisor and the one or more virtual machines.

12. The computing device of claim 5, wherein the privileged service is further configured to:

measure a first set of values associated with the hypervisor at boot time to verify the hypervisor.

13. The computing device of claim 12, wherein the privileged service is further configured to:

receive a first system management interrupt (SMI) from a virtual machine on the host computing device to verify the hypervisor;

measure, by an SMI handler, a second set of values associated with the hypervisor;

compare the second set of values with the first set of values by the SMI handler;

verify the hypervisor by the SMI handler if the second set of values match the first set of values measured at boot time; and receive, from the virtual machine, a second SMI to retrieve the key or to store a new key.

14. The computing device of claim 5, wherein the privileged service is further configured to:

expose a virtual TPM to the one or more virtual machines, wherein the one or more virtual machines are configured to use a system managed interrupt (SMI) to access the key, the key being inaccessible to the hypervisor.

15. The computing device of claim 5, wherein generating the response is further based on authorization information associated with the cryptographic key.

16. The computing device of claim 5, wherein the request to use the key further includes at least one of:

a request that one or more computations be performed using the key; or a request to transmit one or more messages encrypted or signed using the key.

17. A computer implemented method, comprising:

under the control of one or more computer systems configured with executable instructions, storing, by a privileged service, a key on a host computing device, the host computing device including a hypervisor that manages one or more virtual machines, the privileged service having access to at least a portion of memory inaccessible to the hypervisor, the privileged service capable of suspending the hypervisor and running in system management mode (SMM) on the host computing device;

receiving, by the privileged service, a signal that requests to use the key, the signal received from at least one of: the hypervisor or the one or more virtual machines;

measure one or more values associated with the hypervisor;

determine that the hypervisor is unaltered based at least in part on the one or more values associated with the hypervisor; and generating, by the privileged service, a response to the request after determining that the hypervisor is unaltered, the response based at least in part on the key stored on the computing device.

18. The computer implemented method of claim 17, wherein the privileged service is executed on the host computing device using at least one of:

a cryptographic processor, a remote management card, a baseboard management controller (BMC), a component executing in system management mode (SMM), a manageability engine, or one or more processors of the host computing device that do not execute the hypervisor.

19. The computer implemented method of claim 17, further comprising:

measure one or more second values associated with the hypervisor;

determine that the hypervisor is altered based at least in part on the one or more second values associated with the hypervisor; and in response to determining that the hypervisor was altered, performing at least one of:

sending a notification to an external entity, the notification indicating that the hypervisor has been altered; or deleting the key.

20. The computer implemented method of claim 17, wherein storing the key further includes:
- storing the key in a trusted platform module (TPM), wherein the privileged service is configured to have exclusive access to the TPM.

21. A non-transitory computer readable storage medium storing one or more instructions executable by one or more processors to cause a computing system to:
- store, by a privileged service, a key on a host computing device, the host computing device including a hypervisor that manages one or more virtual machines, the privileged service having access to at least a portion of memory inaccessible to the hypervisor, the privileged service capable of suspending the hypervisor and running in system management mode (SMM) on the host computing device;
- receive, by the privileged service, a signal that requests to use the key, the signal received from at least one of: the hypervisor or the one or more virtual machines;
- measure one or more values associated with the hypervisor;
- determine that the hypervisor is unaltered based at least in part on the one or more values associated with the hypervisor; and
- generate, by the privileged service, a response to the request after determining that the hypervisor is unaltered, the response based at least in part on the key stored on the computing device.

22. The non-transitory computer readable storage medium of claim 21, further comprising instructions that cause the computing system to:
- expose a virtual TPM to the one or more virtual machines, wherein the one or more virtual machines are configured to use a system managed interrupt (SMI) to access the key, the key being inaccessible to the hypervisor.

23. The non-transitory computer readable storage medium of claim 21, wherein the privileged service is configured to use authorization information related to the key to generate the response to the request.

24. The non-transitory computer readable storage medium of claim 21, wherein the request to use the key further includes at least one of:
- a request that one or more computations be performed using the key; or
- a request to transmit one or more messages encrypted or signed using the key.

25. The non-transitory computer readable storage medium of claim 21, further comprising instructions that cause the computing system to:
- measure a first set of values associated with the hypervisor at boot time to verify that a trusted hypervisor was launched.

26. The non-transitory computer readable storage medium of claim 25, further comprising instructions that cause the computing system to:
- receive, at runtime, a first system management interrupt (SMI) from a virtual machine on the host computing device;
- measure a second set of values associated with the hypervisor by an SMI handler;
- compare the second set of values with the first set of values by the SMI handler;
- verify the hypervisor by the SMI handler if the second set of values matches the first set of values measured at boot time; and
- receive, from the virtual machine, a second SMI to retrieve the key or to store a new key.

* * * * *